United States Patent
Todd et al.

(10) Patent No.: US 6,877,563 B2
(45) Date of Patent: Apr. 12, 2005

(54) METHODS OF DRILLING AND COMPLETING WELL BORES

(75) Inventors: Bradley L. Todd, Duncan, OK (US); Eric Davidson, Aberdeen (GB)

(73) Assignee: Halliburton Energy Services, Inc., Duncan, OK (US)

( * ) Notice: Subject to any disclaimer, the term of this patent is extended or adjusted under 35 U.S.C. 154(b) by 176 days.

(21) Appl. No.: 10/348,458

(22) Filed: Jan. 21, 2003

(65) Prior Publication Data

US 2004/0140094 A1 Jul. 22, 2004

(51) Int. Cl.$^7$ ............................................. E21B 37/06
(52) U.S. Cl. ..................... 166/312; 166/300; 175/70
(58) Field of Search ................ 166/276, 278, 166/300, 305.1, 311, 312; 175/65, 70, 72

(56) References Cited

U.S. PATENT DOCUMENTS

| | | |
|---|---|---|
| 3,960,736 A | 6/1976 | Free et al. |
| 4,026,361 A | 5/1977 | Knapp et al. ............... 166/281 |
| 4,136,739 A | 1/1979 | Salathiel et al. ............ 166/300 |
| 4,143,007 A | 3/1979 | DeMartino et al. |
| 4,151,879 A | 5/1979 | Thomas ....................... 166/307 |
| 4,169,798 A | 10/1979 | DeMartino |
| 4,247,402 A | 1/1981 | Hartfiel |
| 4,368,136 A | 1/1983 | Murphey |
| 4,536,297 A | 8/1985 | Loftin et al. |
| 5,126,051 A | 6/1992 | Shell et al. .................. 210/632 |
| 5,165,477 A | 11/1992 | Shell et al. .................. 166/291 |
| 5,223,159 A | 6/1993 | Smith et al. |
| 5,224,546 A | 7/1993 | Smith et al. ................. 166/300 |
| 5,783,526 A * | 7/1998 | Dobson et al. .............. 507/261 |
| 6,131,661 A * | 10/2000 | Conner et al. ............... 166/300 |
| 6,196,320 B1 | 3/2001 | Ray et al. .................... 166/312 |
| 6,422,325 B1 | 7/2002 | Krieger ......................... 175/50 |
| 6,432,885 B1 | 8/2002 | Vollmer ....................... 507/236 |
| 6,509,301 B1 | 1/2003 | Vollmer ....................... 507/236 |
| 6,730,637 B1 * | 5/2004 | Stewart et al. .............. 507/125 |
| 2004/0152601 A1 | 8/2004 | Still et al. .................... 507/100 |

FOREIGN PATENT DOCUMENTS

| | | | |
|---|---|---|---|
| EP | 0 672 740 | 3/1995 | ............ C09K/7/02 |
| EP | 0 691 454 | 7/1995 | ............ E21B/21/00 |
| EP | 1 223 207 | 1/2002 | ............ C09K/7/02 |
| WO | WO 00/57022 | 9/2000 | ............ E21B/37/06 |
| WO | WO 01/02698 | 1/2001 | ............ E21B/37/06 |

OTHER PUBLICATIONS

Cantu, et al, "Laboratory and Field Evaluation of a Combined Fluid–Loss–Control Additive and Gel Breaker for Fracturing Fluids," SPE Paper 18211 (1990).

* cited by examiner

*Primary Examiner*—Zakiya Walker
(74) *Attorney, Agent, or Firm*—Robert A. Kent; C. Clark Dougherty, Jr.

(57) ABSTRACT

Methods of drilling and completing open hole well bores and methods of removing filter cake comprised of a gelling agent and calcium carbonate are provided. A method of the invention for removing filter cake comprised of a gelling agent and calcium carbonate from the walls of an open hole well bore is basically comprised of the steps of contacting the filter cake with a delayed clean-up solution comprised of water and a formate ester and removing the clean-up solution from the well bore.

23 Claims, No Drawings

METHODS OF DRILLING AND COMPLETING WELL BORES

BACKGROUND OF THE INVENTION

1. Field of the Invention

The present invention relates to drilling and completing open hole well bores in soft producing zones or formations.

2. Description of the Prior Art

Well bores drilled in soft sandstone, carbonate and the like producing zones or formations are generally completed open-hole, i.e., without a casing or liner installed therein. Special drilling fluids referred to in the art as "drill-in fluids" are used to drill such well bores to minimize the damage to the permeability of the producing zones or formations. A particularly suitable such drill-in fluid used heretofore consists essentially of water, a gelling agent and calcium carbonate. The drill-in fluid forms a filter cake on the walls of the well bore which prevents or reduces fluid loss during drilling, and upon completion of the drilling, stabilizes the well bore during subsequent completion operations such as placing a gravel pack in the well bore.

After the completion operation in the well bore has been accomplished, the filter cake remaining on the walls of the well bore must be removed. This can be accomplished by contacting the filter cake with an aqueous acid solution. However, the use of an aqueous acid solution is hazardous to personnel and often causes tubular goods and the like to be corroded. Also, the aqueous acid solution can react rapidly at the initial point of contact with the well bore thereby creating a fluid loss zone into which the rest of the acid is lost leaving much of the filter cake untouched and in place.

Thus, there are needs for improved clean-up solutions for removing calcium carbonate containing filter cake from open hole well bores.

SUMMARY OF THE INVENTION

Methods of drilling and completing open hole well bores are provided which meet the needs described above and overcome the deficiencies of the prior art. A method of the present invention is basically comprised of the following steps. An open hole well bore in a production zone or formation is drilled using a drilling fluid comprised of water, a gelling agent and calcium carbonate whereby a filter cake is formed on the walls of the well bore which stabilizes the well bore during subsequent completion operations. A completion operation is performed in the well bore and then the filter cake is removed from the walls of the well bore by contacting the filter cake with a delayed clean-up fluid comprised of water and a formate ester that breaks up the filter cake.

The objects, features and advantages of the present invention will be readily apparent to those skilled in the art upon a reading of the description of preferred embodiments which follows.

DESCRIPTION OF PREFERRED EMBODIMENTS

As mentioned above, in the drilling of open hole well bores in zones or formations formed of soft sandstone, carbonate or the like, special drill-in fluids are utilized which are less damaging to permeability than conventional drilling fluids. A particularly suitable drill-in fluid utilized in accordance with the present invention is comprised of water, a gelling agent and calcium carbonate. The filter cake formed on the walls of the open hole well bore by the above described drill-in fluid produces minimum damage to formation permeability and stabilizes the well bore, i.e., prevents sloughing and the like, during subsequent completion operations.

The water in the drilling fluid can be fresh water or salt water. Examples of gelling agents which can be utilized include, but are not limited to, xanthan, starch, carboxymethyl cellulose, scleroglucan and mixtures thereof. Of these, a mixture of xanthan and starch is preferred. When a mixture of xanthan and starch gelling agents is utilized, the xanthan to starch ratio in the mixture is in the range of from about 1:3 to about 1:11. When xanthan alone is utilized, it is generally present in the drilling fluid in an amount of from about 0.25% to about 0.6% by weight of water therein. When a mixture of xanthan and starch is utilized, it is preferably present in the drilling fluid in an amount in the range of from about 1% to about 3% by weight of water therein. The calcium carbonate in the drilling fluid is generally present therein in an amount in the range of from about 10% to about 25% by weight of water therein.

While various subsequent completion operations can be included in the open hole well bore after drilling is completed, the most commonly used completion is a gravel pack. In gravel packing operations, solid gravel particles such as graded sand are carried into the well bore in which a gravel pack is to be placed. Once the gravel is placed in the zone, if the carrier fluid has been viscosified, the viscosity is broken so that the carrier fluid returns to the surface. The gravel pack produced functions as a filter to separate formation solids from produced fluids while permitting the produced fluids to flow into and through the well bore.

After the completion operation has been accomplished, the filter cake on the walls of the well bore is removed in accordance with the present invention by contacting the filter cake with a delayed clean-up fluid comprised of water and a formate ester. Examples of formate esters which can be utilized in accordance with the present invention include, but are not limited to, ethylene glycol monoformate, ethylene glycol diformate, diethylene glycol diformate, glyceryl monoformate, glyceryl diformate, glyceryl triformate, triethylene glycol diformate and formate esters of pentaerythritol. Of these, ethylene glycol monoformate and diethylene glycol diformate are preferred. The formate ester utilized is included in the clean-up fluid in an amount in the range of from about 5% to about 25% by weight of water therein.

The water in the clean-up fluid can be fresh water or salt water. The term "salt water" is used herein to mean unsaturated salt solutions and saturated salt solutions including brines and seawater.

The action of the formate ester in the clean-up fluid is delayed, i.e., the ester does not dissociate by hydrolysis to produce formic acid until after the clean-up fluid has been placed in the horizontal well bore. The formic acid produced reacts with the calcium carbonate and other components of the filter cake whereby the filter cake is removed from the walls of the well bore. Because the formic acid is produced slowly in-situ, the pH is never as low as would be the case if an aqueous solution of formic acid was pumped into the well bore. Furthermore, as the formic acid is produced, it reacts with the calcium carbonate of the filter cake and the calcium formate so formed has a buffering effect on the fluid, thus further inhibiting the development of low pH and the risk of corrosion of the metal tubulars or other metal parts in the well bore.

A method of this invention for removing filter cake comprised of a gelling agent and calcium carbonate from the walls of an open hole well bore is comprised of the following steps. The filter cake is contacted with a delayed clean-up fluid comprised of water and a formate ester. Thereafter, the clean-up fluid is removed from the well bore. The components of the clean-up fluid and their amounts are the same as described above.

The clean-up fluid can optionally also include a gelling agent breaker for reducing the viscosity of the gelling agent in the filter cake, a surfactant for water wetting oil wet solids in the filter cake and a corrosion inhibitor to prevent corrosion of metal tubulars and the like. Examples of gelling agent breakers which can be used in the clean-up fluid include, but are not limited to, encapsulated oxidizing agents and enzymes such as alpha amylase (degrades starch), beta amylase (degrades cellulose) and lipase (degrades other gelling agents). Examples of surfactants that can be used include, but are not limited to, non-ionic surfactants such as ethoxylated fatty alcohols and alkoxylated fatty alcohol derivatives. Examples of corrosion inhibitors that can be used include, but are not limited to, acetylenic acid derivatives, polymeric amines/polyoxyethylene mixtures and mixtures of amines and thio compounds.

A preferred method of this invention for drilling and completing an open hole well bore is comprised of the steps of: (a) drilling the open hole well bore using a drilling fluid comprised of water, a gelling agent and calcium carbonate whereby a filter cake is formed on the walls of the well bore which stabilizes the well bore during subsequent completion operations; (b) performing a subsequent completion operation in the well bore; and then (c) removing the filter cake from the walls of the well bore by contacting the filter cake with a delayed clean-up fluid that dissolves the filter cake comprised of water and a formate ester.

A preferred method of this invention for removing filter cake comprised of a gelling agent and calcium carbonate from the walls of an open hole well bore is comprised of the steps of: (a) contacting the filter cake with a delayed clean-up fluid comprised of water and a formate ester; and (b) removing the clean-up fluid from the well bore.

In order to further illustrate the methods of this invention, the following examples are given.

EXAMPLE 1

Filter cakes comprised of water, a starch gelling agent and calcium carbonate were exposed to solutions of formate esters and allowed to soak for 24 or 48 hours at a typical bottom hole temperature of about 150° F. The degree of cleaning was then assessed. The experimental method utilized is as follows. A high temperature high pressure cell was fitted with a 5 micron ceramic disc as the porous medium. The cell was filled with water, sealed and pressurized at 100 psig and the rate of discharge through the ceramic disc was measured to give an indication of the original permeability of the disc. A filter cake was then formed on the disc at a temperature of 150° F. and a pressure differential of 300 psi for 30 minutes. The supernatant liquor was then rinsed out and the cell was filled with a solution of formate ester comprised of water having 3% potassium chloride dissolved therein, a mixture of monoethylene glycol monoformate and monoethylene glycol diformate or diethylene glycol diformate, alpha amylase (starch enzyme) for degrading the starch gelling agent and an ethoxylated fatty alcohol surfactant. The contents of the cell were then allowed to soak for 28 or 48 hours at 150° F. without any applied pressure. Thereafter, the fluid in the cell was removed and the cell was filled with water, sealed and pressurized at 100 psi and the rate of discharge was again measured giving an indication of the permeability of the disc after the filter cake had been removed, i.e., an indication of the degree of filter cake removal.

The components utilized and their amounts are given in Table I below along with the initial rate of discharge of 200 milliliters of water through the ceramic disc prior to placing the filter cake thereon and the rate of discharge of 200 milliliters of water after the filter cake was contacted with the formate ester solution.

TABLE I

| | Test No. | | | | | | | | | |
|---|---|---|---|---|---|---|---|---|---|---|
| | 1 | 2 | 3 | 4 | 5 | 6 | 7 | 8 | 9 | 10 |
| 3% Potassium Chloride Solution, milliliters | 527.4 | 527.4 | 527.4 | 527.4 | 527.4 | 527.4 | 527.4 | 527.4 | 527.4 | 527.4 |
| Mixture of Ethylene Glycol Monoformate and Ethylene Glycol Diformate, milliliters | 52.5 | — | 52.5 | — | 52.5 | — | 52.5 | — | 52.5 | — |
| Diethylene Glycol Diformate, milliliters | — | 52.5 | — | 52.5 | — | 52.5 | — | 52.5 | — | 52.5 |
| Alpha Amylase (Starch Enzyme) | 0.75 | 0.75 | 0.75 | 0.75 | 0.75 | 0.75 | 0.75 | 0.75 | 0.75 | 0.75 |
| Ethoxylated Fatty Alcohol Surfactant, milliliters | 1.16 | 1.16 | 1.16 | 1.16 | 1.16 | 1.16 | 1.16 | 1.16 | 1.16 | 1.16 |
| Initial Discharge Rate, seconds/200 milliliters | 13 | 11 | 25 | 17 | 24 | 18 | 14.5 | 25 | 17 | 36 |
| Soak Duration, hours | 48 | 48 | 24 | 24 | 24 | 24 | 24 | 24 | 48 | 48 |
| Final Discharge Rate, seconds/200 milliliters | 12 | 12 | 39 | 21 | 30 | 14 | 26 | 27 | 19 | 37 |

From Table I it can be seen that the discharge rate before the filter cake was placed on the ceramic disc and the discharge rate after the filter cake was placed on the ceramic disc and removed are very similar indicating the filter cake was substantially dissolved by the formate ester clean-up fluid of this invention.

EXAMPLE 2

The procedure described in Example 1 was repeated except that the clean-up solution was comprised of water containing 3% potassium chloride, diethylene glycol diformate, alpha amylase and an ethoxylated fatty alcohol surfactant. The components of the clean-up fluid and the results of the injectivity tests are set forth in Table II below.

TABLE II

|  | Test No. | | | | | | |
| --- | --- | --- | --- | --- | --- | --- | --- |
|  | 1 | 2 | 3 | 4 | 5 | 6 | 7 |
| 3% Potassium Chloride Solution, milliliters | 527.4 | 527.4 | 527.4 | 527.4 | 527.4 | 527.4 | 527.4 |
| Diethylene glycol diformate, milliliters | 52 | 52 | 52 | 52 | 52 | 52 | 52 |
| Alpha-Amylase, milliliters | 0.12 | 0.12 | 0.12 | 0.12 | 0.12 | 0.12 | 0.12 |
| Ethoxylated Fatty Alcohol Surfactant, milliliters | 0.17 | 0.17 | 0.17 | 0.17 | 0.17 | 0.17 | 0.17 |
| Initial Discharge Rate, seconds/200 milliliters | 36 | 11 | 25 | 13 | 20 | 21 | 25 |
| Soak Duration, hours | 64 | 48 | 24 | 16 | 16 | 8 | 8 |
| Final Discharge Rate, seconds/200 milliliters | 37 | 12 | 27 | 13 | 39 | 27 | 37 |

From Table II it can be seen that the clean-up solution of this invention achieved excellent results.

EXAMPLE 3

The tests set forth in Example 2 were repeated except that a corrosion inhibitor based on a mixture of thioglycolic acid and ethoxylated alkyl amines was included in the clean-up fluid. The corrosion inhibitor is commercially available under the trade designation "MSA III™" from Halliburton Energy Services, Inc. of Duncan, Okla. The components in the clean-up fluid and the test results are set forth in Table III below.

From Table III it can be seen that the clean-up fluid of this invention which included a corrosion inhibitor also achieved excellent results.

EXAMPLE 4

The test procedure of Example 2 was repeated except that the tests were conducted at a temperature of 275° F. and amylase was omitted because the test temperature exceeds the thermal stability of the enzyme. The results of the tests are set forth in Table IV below.

TABLE IV

|  | Test No. | | | |
| --- | --- | --- | --- | --- |
|  | 1 | 2 | 3 | 4 |
| 3% Potassium Chloride Solution, milliliters | 527.4 | 527.4 | 527.4 | 527.4 |
| Diethylene glycol diformate, milliliters | 52 | 52 | 52 | 52 |
| Surfactant, milliliters | 0.17 | 0.17 | 0.17 | 0.17 |

TABLE III

|  | Test No. | | | | | | | | |
| --- | --- | --- | --- | --- | --- | --- | --- | --- | --- |
|  | 1 | 2 | 3 | 4 | 5 | 6 | 7 | 8 | 9 |
| 3% Potassium Chloride Solution, milliliters | 527.4 | 527.4 | 527.4 | 527.4 | 527.4 | 527.4 | 527.4 | 527.4 | 527.4 |
| Diethylene glycol diformate, milliliters | 52 | 52 | 52 | 52 | 52 | 52 | 52 | 52 | 52 |
| Alpha-Amylase, milliliters | 0.12 | 0.12 | 0.12 | 0.12 | 0.12 | 0.12 | 0.12 | 0.12 | 0.12 |
| Surfactant, milliliters | 0.17 | 0.17 | 0.17 | 0.17 | 0.17 | 0.17 | 0.17 | 0.17 | 0.17 |
| Corrosion Inhibitor, milliliters | 1.7 | 1.7 | 1.7 | 1.7 | 1.7 | 1.7 | 1.7 | 1.7 | 1.7 |
| Initial Discharge Rate, seconds/20 milliliters | 13 | 17 | 11 | 25 | 37 | 15 | 25 | 22 | 25 |
| Soak Duration, hours | 16 | 16 | 8 | 8 | 48 | 48 | 16 | 16 | 8 |
| Final Discharge Rate, seconds/200 milliliters | 14 | 17 | 22 | 40 | 48 | 15 | 42 | 28 | 90 |

TABLE IV-continued

| | Test No. | | | |
|---|---|---|---|---|
| | 1 | 2 | 3 | 4 |
| Corrosion Inhibitor, milliliters | 1.7 | 1.7 | 1.7 | 1.7 |
| Initial Discharge Rate, seconds/200 milliliters | 18 | 25 | 11 | 13 |
| Soak Duration, hours | 16 | 16 | 8 | 8 |
| Final Discharge Rate, seconds/200 milliliters | 18 | 25 | 17 | 15 |

From Table IV, it can be seen that the clean-up fluid of the present invention achieved excellent results at 275° F.

Thus, the present invention is well adapted to carry out the objects and attain the ends and advantages mentioned as well as those which are inherent therein. While numerous changes can be made by those skilled in the art, such changes are encompassed within the spirit of this invention as defined by the appended claims.

What is claimed is:

1. A method of drilling and completing an open hole well bore comprising the steps of:
   (a) drilling said open hole well bore using a drilling fluid comprised of water, a gelling agent and calcium carbonate whereby a filter cake is formed on the walls of said well bore which stabilizes said well bore during subsequent completion operations;
   (b) performing a completion operation in said well bore; and then
   (c) removing said filter cake from the walls of said well bore by contacting said filter cake with a delayed clean-up solution that dissolves said filter cake comprised of water and a formate ester.

2. The method of claim 1 wherein said formate ester in said clean-up solution is selected from the group consisting of monoethylene glycol monoformate, monoethylene glycol diformate, diethylene glycol diformate, glyceryl monoformate, glyceryl diformate, glyceryl triformate, triethylene glycol diformate, formate esters of pentaerythritol and mixtures thereof.

3. The method of claim 1 wherein said formate ester in said clean-up solution is diethylene glycol diformate.

4. The method of claim 1 wherein said water in said clean-up solution is selected from the group consisting of fresh water and salt water.

5. The method of claim 1 wherein said formate ester is present in said clean-up solution in an amount in the range of from about 4% to about 60% by weight of water therein.

6. The method of claim 1 wherein said water in said drilling fluid is selected from the group consisting of fresh water and salt water.

7. The method of claim 1 wherein said gelling agent in said drilling fluid is selected from the group consisting of xanthan, starch, carboxymethyl cellulose, scleroglucan and mixtures thereof.

8. The method of claim 1 wherein said gelling agent is xanthan.

9. The method of claim 8 wherein said xanthan is present in said drilling fluid in an amount in the range of from about 0.25% to about 0.6% by weight of water therein.

10. The method of claim 1 wherein said gelling agent is a mixture of xanthan and starch.

11. The method of claim 10 wherein the ratio of xanthan to starch in said mixture is in the range of from about 1:3 to about 1:11.

12. The method of claim 10 wherein said mixture of xanthan and starch is present in said drilling fluid in an amount in the range of from about 1.0% to about 3.0% by weight of water therein.

13. The method of claim 1 wherein said calcium carbonate is present in said drilling fluid in an amount in the range of from about 10% to about 25% by weight of water therein.

14. The method of claim 1 wherein said completion operation is the placing of a gravel pack in said well bore.

15. A method of removing filter cake comprised of a gelling agent and calcium carbonate from the walls of an open hole well bore comprising the steps of:
   (a) contacting said filter cake with a delayed clean-up solution comprised of water and a formate ester; and
   (b) removing said clean-up solution from said well bore.

16. The method of claim 15 wherein said formate ester in said clean-up solution is selected from the group consisting of ethylene glycol monoformate, ethylene glycol diformate, diethylene glycol diformate, glyceryl monoformate, glyceryl diformate, glyceryl triformate, triethylene glycol diformate, formate esters of pentaerythritol and mixtures thereof.

17. The method of claim 15 wherein said formate ester in said clean-up solution is diethylene glycol diformate.

18. The method of claim 15 wherein said water in said clean-up solution is selected from the group consisting of fresh water and salt water.

19. The method of claim 15 wherein said formate ester is present in said clean-up solution in an amount in the range of from about 5% to about 40% by weight of water therein.

20. The method of claim 15 wherein said gelling agent is selected from the group consisting of xanthan, starch, carboxymethyl cellulose, scleroglucan and mixtures thereof.

21. The method of claim 15 wherein said gelling agent is xanthan.

22. The method of claim 15 wherein said gelling agent is a mixture of xanthan and starch.

23. The method of claim 22 wherein the ratio of xanthan to starch in said mixture is in the range of from about 1:3 to about 1:11.

* * * * *